United States Patent [19]

Barrows et al.

[11] Patent Number: 5,184,511
[45] Date of Patent: Feb. 9, 1993

[54] MEASURING TANK SIGHT GLASS

[75] Inventors: Peter S. Barrows, Yardley, Pa.; James A. Willis, Waverly Hall, Ga.

[73] Assignee: FMC Corporation, Chicago, Ill.

[21] Appl. No.: 779,224

[22] Filed: Oct. 18, 1991

[51] Int. Cl.⁵ .............................................. G01F 23/02
[52] U.S. Cl. ...................................... 73/323; 137/559
[58] Field of Search .......................... 73/323, 326, 328; 137/559

[56] References Cited

U.S. PATENT DOCUMENTS

| | | | |
|---|---|---|---|
| 1,094,098 | 4/1914 | Rakottyay | 73/323 X |
| 1,923,737 | 8/1933 | MacLean | 73/332 |
| 2,664,645 | 1/1954 | Qualman | 73/323 X |
| 3,062,049 | 11/1962 | Javor | 73/323 |
| 3,832,901 | 9/1974 | Girvin, III | 116/227 X |
| 4,550,602 | 11/1985 | Burke, Sr. et al. | 116/227 X |
| 4,987,777 | 1/1991 | Bourret et al. | 73/328 |

Primary Examiner—Daniel M. Yasich
Attorney, Agent, or Firm—Ronald C. Kamp; R. B. Megley

[57] ABSTRACT

A measuring tank capable of providing accurate measurement of liquid contained therein even when not in an upright position having a rear wall connected to left and right side walls and a front wall connected between said side walls and having a generally concave shape with a sight glass affixed thereto adjacent its closest approach to the rear wall. The volume of the tank to the left and right of a plane passing through the centerline of the sight glass being equal and the volume of the tank to the front and rear of a plane passing through the centerline of the sight glass parallel to the rear wall being equal.

4 Claims, 2 Drawing Sheets

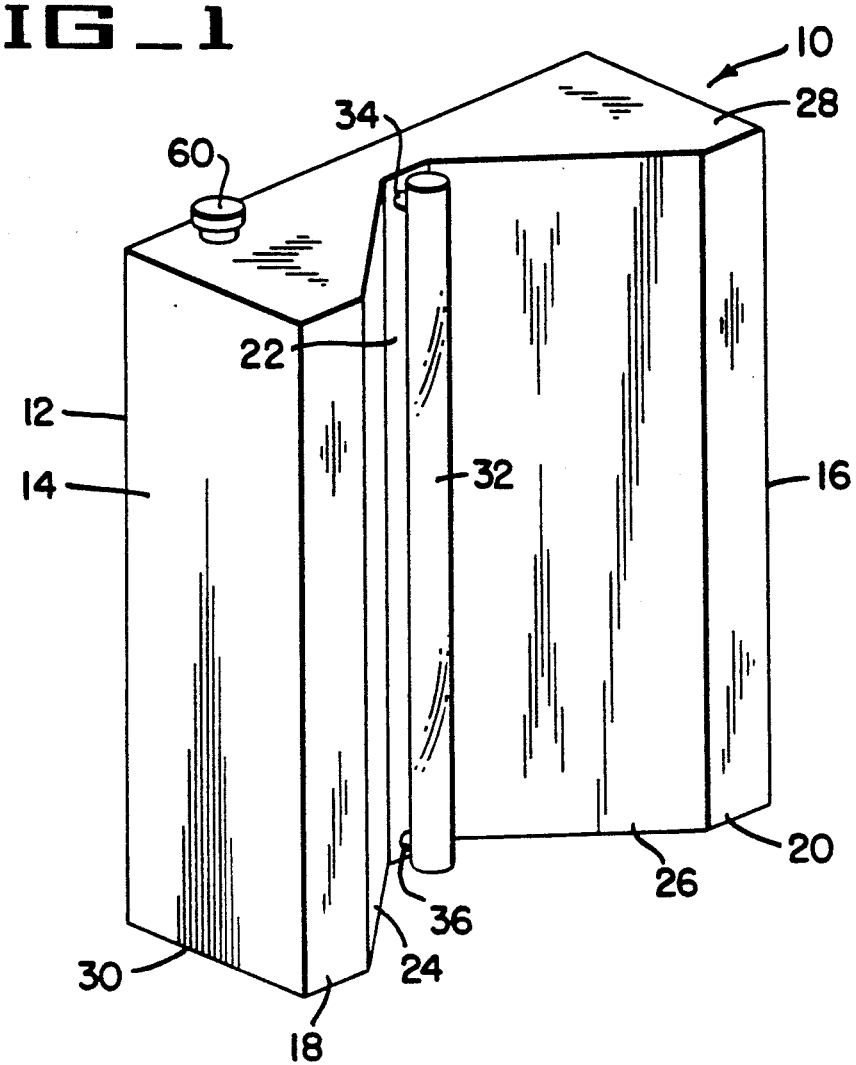
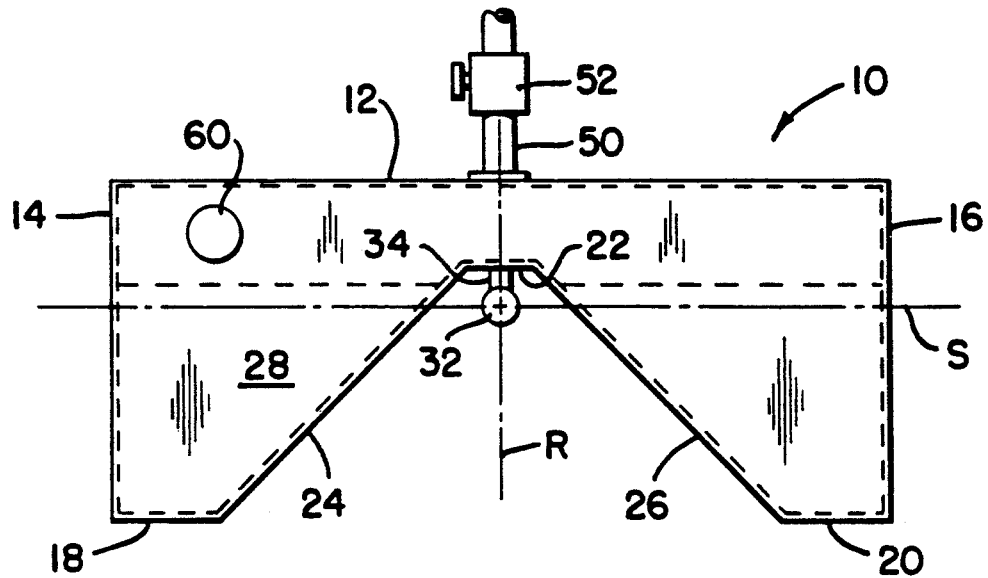

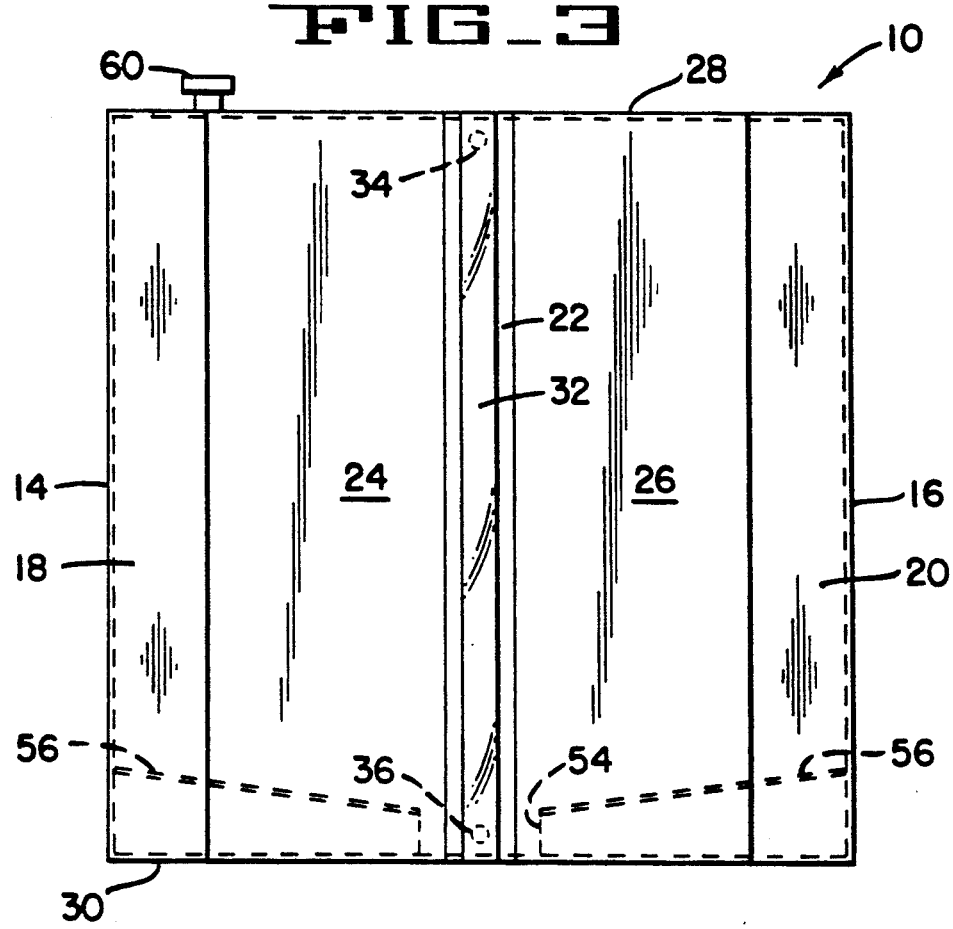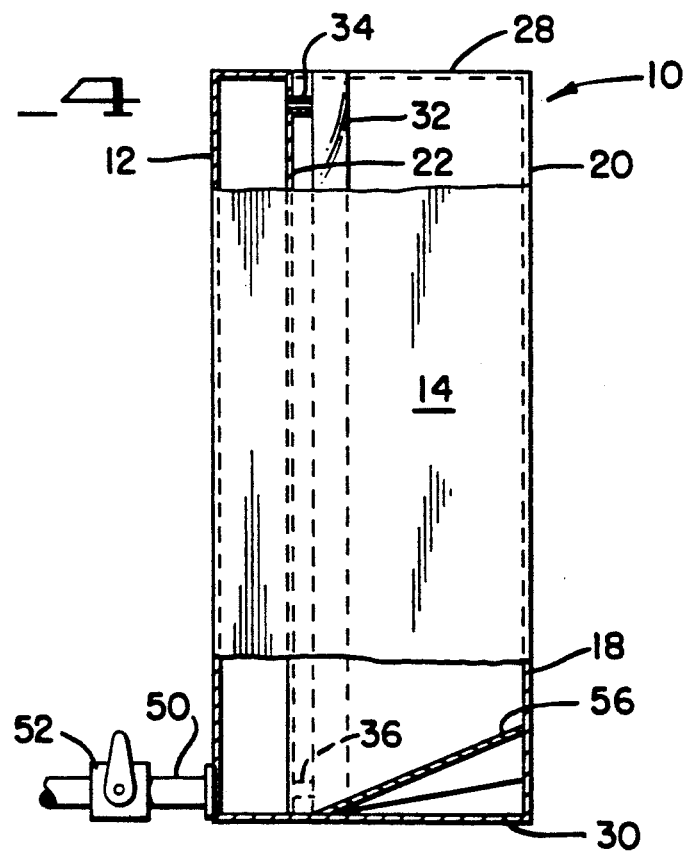

MEASURING TANK SIGHT GLASS

This invention relates generally to tanks capable of measuring the volume of a liquid contained therein, and more particularly, to such tanks which will provide an accurate and reliable measurement with the tank positioned in a wide range of angular orientations.

The process of applying certain chemicals, such as pesticides or fungicides for example, typically involves the mixing of a concentrate of the chemical with water to produce a solution having the proper concentration for safe and effective application. The concentration of the solution, i.e. the number of parts of chemical to the number of parts of water, is very important and the accuracy of that concentration is heavily dependent on an accurate measurement of the chemical. The greater dependence on the measurement of the chemical is due to the fact that a relatively small volume of the chemical concentrate is added to a relatively large volume of water to produce a solution having the desired concentration. Since the solution may be prepared in the field, the measurement of the chemical volume must be accomplished reliably and accurately under a wide range of conditions. The measurement must be accomplished to maximum accuracy. A small variation in the volume of chemical concentrate will therefore have a greater affect on the concentration of the solution than a small variation in the volume of water.

Calibrated measuring devices for tanks have been provided in the prior art to determine the volume of liquid present therein, and generally have had the capability to provide sufficient accuracy for the above-stated purpose. These devices have even compensated for or been unaffected by the tank being canted from its upright position. Typically such an arrangement consisted of a float or a sight glass located in the center of a cylindrical tank. The volume of liquid in the tank had to be determined by looking through the side wall of the tank or by an indicator slideably protruding through the top of the tank. In the former case, the tank had to be transparent, at least in part, and had to remain so throughout its useful life. But the tank also must be strong and durable. Materials that possess these properties, as well as being transparent, are few and are often clouded or otherwise adversely affected by the chemicals, especially with repeated exposure. In the latter case, it is difficult to seal the protruding indicator and leakage of the chemical from the tank is highly likely. Such a possibility is not acceptable since pesticides, fungicides and other similar chemicals have the potential for harming human health and the environment.

The present invention provides a measuring tank which accurately and reliably indicates the volume of liquid contained therein, which does not require transparent side walls, which dependably seals the liquid inside, which accurately indicates the volume of liquid even when the tank is supported on a surface which is not horizontal, which is strong, rugged and durable and which is relatively easy to manufacture and maintain. These and other attributes, and many of the attendant advantages thereof, will become more readily apparent from a perusal of the following description and the accompanying drawings, wherein:

FIG. 1 is an isometric view of a measuring tank according to the present invention;

FIG. 2 is a top plan view of the tank shown in FIG. 1;

FIG. 3 is a front elevational view of the tank in FIG. 1; and

FIG. 4 is a side elevational view of the tank in FIG. 1.

Referring now to the drawings, there is shown a tank, indicated generally at 10, having a rear wall 12 and left and right side walls 14 and 16, respectively. The wall opposite the rear wall consists of outer left and right wall segments 18 and 20, respectively, and a central segment 22 with angled wall segments 24 and 26 extending between the central segment 22 and the segments 18 and 20 respectively. The segments 18, 20 and 22 are arranged substantially parallel to the rear wall 12. The walls and wall segments are contiguous with and sealed to or formed integral with those adjacent and with top and bottom members 28 and 30. The walls and wall segments are all straight and provide essentially constant cross-sections when cut by planes passing therethrough parallel to the top member. A sight glass 32, which is merely a clear glass, hollow tube, is mounted on and extends parallel to the central segment 22. Upper and lower tubes 34 and 36 provide both support for the sight glass and fluid communication between the sight glass and the interior of the tank 10, so that the level of a liquid in the tank will be the same, as the level in the sight glass 32 when the tank is properly oriented.

In order that the level of liquid in the sight glass 32 will be the same as it would be if the tank 10 were properly oriented even when the surface on which its support is not horizontal, the volume cross-section of the tank 10 to the left of a plane R passing through the longitudinal centerline of the sight glass 32 perpendicular to the rear wall 12 must be substantially equal to the volume cross-section of the tank 10 to the right of the plane R, and the volume cross-section of the tank to the rear of a plane S passing through the centerline parallel to the rear wall 12 must be substantially equal to the volume cross-section of the tank 10 in front of the plane S. If a sump is provided in the tank 10, as described hereinafter, the volume cross-section relationship to the left and right of the plane R would hold true if the sump is centered on the rear wall 12, but the volume cross-section relationship to the front and rear of the plane S would be equal exclusive of the sump, i.e., exclusive of the volume cross-section defined by the horizontal level below the highest point any sloping floor defining the sump intersects one of the walls or wall segments. Stated differently, the center of the sight glass 32 in plan view is at the centroid of the area defined by the perimeter of the tank 10 in plan view, i.e., the centroids of cross-sections defined by horizontal plans passing through the tank would define a line which is coextensive with the centerline of the sight glass. With such a relatioship, it is possible to position the sight glass 32 on the exterior of the tank 10 and still achieve accurate indications of the volume of liquid in the tank even when the tank is oriented over a relatively wide range of angular orientation. This attribute is especially useful when the tank is mounted, or otherwise carried, in a truck or other vehicle, which may be supported on a surface canted to one side, or even if on a level surface, may itself be canted because of an unequal load distribution. The sight glass 32, being positioned near the closest approach to the rear wall 12 of the essentially concave surface formed by the angled wall segments 24 and 26 and the wall segment 22, is protected from being broken, or otherwise damaged, while still being easily viewed.

The tank 10 may have a pipe 50 with a valve 52 through which liquid may be introduced to or drained from the tank. The pipe 50 extends through the rear wall 12 into a sump 54 formed in a floor 56 in the tank, which floor slopes downward from the side walls 14 and 16 toward the middle and downward from the front wall toward the rear wall to direct liquid toward the sump. An opening in the top member 28 permits visual inspection of the tank interior and threadedly accepts a conventional vented plug 60 to permit the free flow of gases into and out of the tank 10 as chemicals go into and out of the tank through pipe 50.

While a preferred embodiment of the present invention has been illustrated and described herein, it is to be understood that various changes may be made thereto without departing from the spirit of the invention as defined by the scope of the appended claims.

What is claimed is:

1. A tank capable of providing a consistent indication of liquid contained therein even when in an askew orientation; comprising:
   a rear wall;
   left and right side walls extending from said rear wall;
   a front wall extending between said side walls and having a generally concave shape;
   a sight glass affixed to said front wall adjacent the nearest approach thereof to said rear wall and communicating with the interior of said tank, said sight glass having a longitudinal centerline;
   the volume of said tank to the left of a first plane passing through said centerline perpendicular to said rear wall being equal to the volume of the said tank to the right of said first plane; and
   the volume of the tank to the rear of a second plane passing through said centerline parallel to said rear wall being equal to the volume of the tank to the front of said second plane, whereby the level of the liquid in said sight glass for a given volume of liquid in said tank will be the same even though the tank is canted.

2. A tank capable of providing a consistent indication of liquid contained therein even when supported on a surface which is not horizontal; comprising:
   an enclosed tank having a uniform horizontal cross-section;
   said cross-section having a centroid located outside of said cross-section;
   a sight glass communicating with said tank and having a longitudinal centerline;
   said sight glass attached to the exterior of said tank, so that said centerline intersects said centroid whereby the level of the liquid in said sight glass for a given volume of liquid in said tank will be in the same even though tht tank is canted.

3. A tank capable of providing a consistent indication of liquid contained therein comprising:
   an enclosed tank having upright walls;
   said walls forming uniform cross-section when cut by horizontal planes;
   said cross-sections having centroids that lie outside the perimeter of said tank;
   said centroids defining a line; and
   a sight glass, having a longitudinal centerline, afixed to said tank so that said centerline is coextensive with said line, whereby the level of the liquid in the sight glass will provide an accurate indication of the volume of liquid in said tank even though the tank is canted from vertical.

4. A tank capable of consistently indicating liquid contained therein comprising:
   contiguous interconnected walls defining a perimeter;
   said perimeter having a centroid;
   said centroid falling outside of said perimeter; and
   a sight glass, having a longitudinal centerline, affixed to said walls with said centerline intersecting said centroid, whereby the level of the liquid in the sight glass will provide an accurate indication of the volume of liquid in said tank even though the tank is canted from vertical.

* * * * *